(12) United States Patent  
Müller et al.

(10) Patent No.: US 11,052,764 B2  
(45) Date of Patent: Jul. 6, 2021

(54) POWER SUPPLY DEVICE

(71) Applicant: Volkswagen Aktiengesellschaft, Wolfsburg (DE)

(72) Inventors: Mathias Müller, Gifhorn (DE); Eugen Nürnberg, Celle (DE); Dennis Hoffmeister, Wolfsburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 219 days.

(21) Appl. No.: 16/256,125

(22) Filed: Jan. 24, 2019

(65) Prior Publication Data

US 2019/0225085 A1     Jul. 25, 2019

(30) Foreign Application Priority Data

Jan. 25, 2018   (DE) ..................... 10 2018 101 704.9

(51) Int. Cl.
  *B60L 1/00* (2006.01)
  *B60R 16/033* (2006.01)
  (Continued)

(52) U.S. Cl.
  CPC .......... *B60L 1/006* (2013.01); *B60R 16/0232* (2013.01); *B60R 16/033* (2013.01);
  (Continued)

(58) Field of Classification Search
  None
  See application file for complete search history.

(56) References Cited

U.S. PATENT DOCUMENTS 5,555,483 A * 9/1996 Pressman ............... H02H 3/207  
  340/661  
5,859,756 A * 1/1999 Pressman ............... H02H 3/207  
  361/18  
(Continued)

FOREIGN PATENT DOCUMENTS

DE   10 2011 089 556 A1   6/2013  
DE   10 2013 201 641 A    7/2014  
(Continued)

OTHER PUBLICATIONS

Search report for German Patent Application No. 10 2018 101 704.9, dated Oct. 8, 2018.

(Continued)

*Primary Examiner* — Rexford N Barnie  
*Assistant Examiner* — Terrence R Willoughby  
(74) *Attorney, Agent, or Firm* — Pearl Cohen Zedek Latzer Baratz LLP

(57) ABSTRACT

An energy supply device for supplying electric power to a consumer of a vehicle has an input for establishing a connection to an on-board network of the vehicle in order to provide an input voltage for a transmission arrangement, an output for outputting a supply voltage to operate the consumer, a transmission arrangement for purposes of transmitting electric energy between the input and the output, whereby the transmission arrangement comprises a signaling adaptation means, so that, as a function of a deviation of the input voltage that is critical for the electric power supply, a signal is impressed upon the supply voltage, whereby the signal can be evaluated in the consumer on the basis of the supply voltage.

9 Claims, 3 Drawing Sheets

(51) Int. Cl.
*B60R 16/023* (2006.01)
*H02M 3/335* (2006.01)
*H02M 1/00* (2006.01)

(52) U.S. Cl.
CPC ....... *H02M 3/335* (2013.01); *H02M 3/33523* (2013.01); *B60L 2210/12* (2013.01); *B60L 2210/14* (2013.01); *H02M 2001/0022* (2013.01)

(56) References Cited

U.S. PATENT DOCUMENTS

| | | | |
|---|---|---|---|
| 6,003,140 A | 12/1999 | Pientka et al. | |
| 2005/0111245 A1* | 5/2005 | Lai | H02M 5/293 363/125 |
| 2007/0230226 A1* | 10/2007 | Lai | H02M 5/4585 363/65 |
| 2013/0027978 A1 | 1/2013 | Suzuki et al. | |

FOREIGN PATENT DOCUMENTS

| | | |
|---|---|---|
| EP | 0 815 511 B1 | 1/1998 |
| JP | H01 292 265 A | 11/1989 |

OTHER PUBLICATIONS

Search report for European Patent Application No. 19153515.2, dated Jul. 9, 2019.

\* cited by examiner

US 11,052,764 B2

POWER SUPPLY DEVICE

FIELD OF THE INVENTION

The present invention relates to an energy supply device for purposes of supplying electric power to a consumer of a vehicle, whereby especially a galvanic isolation is provided between an input of the energy supply device for purposes of establishing a connection to an energy supply source (for instance, by means of the on-board network of a vehicle) and an output of the energy supply device for purposes of outputting a supply voltage for the consumer. In other words, a galvanic isolation can be provided between the consumer and the energy supply source. Moreover, the invention relates to a system having the energy supply device involved.

BACKGROUND OF THE INVENTION

It is a known fact that control units of a vehicle have to be supplied with an on-board network voltage that is as stable as possible. Towards this end, an energy supply device such as, for example, a flyback converter, is installed upstream from the control unit. If this level of stability cannot be maintained, for example, because the input voltage of the energy supply device in the on-board network exhibits an undervoltage, then it is necessary to initiate appropriate measures so as to ensure reliable operation. In order for such measures to be reliably initiated, a measuring circuit that monitors the input voltage of the energy supply device is normally employed in addition to the energy supply device. This, however, requires at least one voltage sensor on the voltage side of the vehicle on-board network whose measured value then has to be optically or inductively coupled, particularly in a galvanically isolated manner, to the non-voltage side of the control unit of the vehicle on-board network. This constitutes a technically complex and cost-intensive solution in terms of the circuit technology resources.

German patent application DE 10 2013 201 641A1 as well as European patent specification EP 0 815 511 B1 disclose energy supply devices of this generic type in which a separate signal (in the form of a so-called reset signal) is employed in order to signal an undervoltage.

Before this backdrop, an objective of the present invention is to at least partially overcome the disadvantages described above. In particular, it is an objective of the present invention to put forward an improved solution for providing electric power to a consumer of a vehicle.

SUMMARY OF THE INVENTION

The above-mentioned objective is achieved by means of an energy supply device having the features of claim 1 and by means of a system having the features of claim 8. Additional features and details of the invention ensue from the individual subordinate claims, from the description and from the drawings. In this context, it goes without saying that features and details that are described in conjunction with the energy supply device according to the invention also apply in conjunction with the system according to the invention and vice versa, so that, when it comes to the disclosure, reciprocal reference is or can always be made among the individual aspects of the invention.

The objective is especially achieved by means of an energy supply device for purposes of supplying electric power to a consumer of a vehicle. The energy supply device is preferably configured as a DC-DC converter (also: high-low controller) and/or flyback converter, which provides the (entire) electric power supply to the consumer, particularly a control-device voltage for the consumer as a control unit. For this purpose, the energy supply device can comprise at least the following:

an input for purposes of establishing a connection to an on-board network of the vehicle so as to provide an input voltage for a transmission arrangement, an output for purposes of outputting a supply voltage to operate the consumer, especially for purposes of establishing an electric connection to the consumer, so as to preferably provide the entire electric power supply for the consumer, the transmission arrangement for purposes of transmitting electric energy between the input and the output.

It is also possible, and conceivably advantageous in order to attain a reliable operation, to provide a galvanic isolation between the consumer and the on-board network (or the input voltage as the supply on the input side for the energy supply device). In order to do so, the energy supply device can be appropriately adapted and can have, for instance, at least one optocoupler or the like. In particular, a galvanic isolation can be provided between the input of the energy supply device for purposes of establishing the connection to the supply source (e.g. by means of the on-board network of a vehicle) and the output of the energy supply device for purposes of outputting the supply voltage for the consumer, for instance, by interconnecting the optocoupler between the input and the output.

It can be provided for the transmission arrangement to comprise a signaling adaptation means, so that, as a function of a deviation of the input voltage that is critical for the electric power supply, a signal is impressed upon the supply voltage, whereby the signal can be evaluated in the consumer on the basis of the supply voltage. In other words, in terms of circuit technology, the transmission arrangement (preferably through hardware configuration) can be designed in such a way that, for example, in case of an undervoltage that is to be detected within an undervoltage range of the input voltage or if the input voltage falls below a critical value such as, for instance, 6.8 volts, then a defined, signal-based behavior is generated on the non-voltage side of the on-board network (in other words, in the consumer), said behavior being, for instance, a voltage jump or a voltage pulse or a voltage pattern in the supply voltage, particularly at the output of the energy supply device. This signal can be detected by an evaluation logic circuit such as an evaluation device of the consumer. Consequently, the undervoltage range or the undervoltage event is detected and the consumer, particularly the control unit, can respond appropriately by initiating measures. Conceivable measures are, for instance, an emergency mode of operation or a switch-off. Thus, if the input voltage is below the critical voltage value, then components of the consumer such as a CAN controller and/or a CAN bus driver can be switched off. In particular, this ensures safe and reliable operation.

When galvanic isolation is used, there is the extra advantage that there is no need to provide additional, separate galvanically isolated measuring circuits. This allows a considerable reduction of the technical resources and costs involved. In other words, it might be the case that the galvanic isolation only has to be provided once (exclusively) in the energy supply device.

The term "impressing the signal" as set forth within the scope of the invention refers especially to the fact that the supply voltage at the output of the energy supply device is adapted (generated) in such a way that its course over time represents the signal (or the event on the input side). In this context, for purposes of impressing the signal, the course of the supply voltage as the output voltage of the energy supply device can be influenced by the signaling adaptation, for example, on the basis of the design of the electric components of the transmission arrangement in such a way that (for instance, in a passive and/or parasitic manner, in other words, not actively controlled) this yields a characteristic course of the output voltage as soon as the input voltage falls below a critical value as the threshold value. Consequently, this constitutes a passive monitoring of the input voltage and thus not an active measurement. It is conceivably also possible for the input voltage to be actively monitored and/or measured, and then the output voltage is actively influenced (e.g. by means of a microcontroller). It is optionally likewise possible for the output voltage to be modulated as a function of the monitoring and of the critical deviation.

Within the scope of the invention, it can also be the case that an electric storage arrangement is provided for purposes of storing energy. This electric storage arrangement can ensure that, in order to compensate for a drop in the input voltage, the supply voltage is kept at a predefined operating voltage level (e.g. 12 V) of the consumer during the drop as well, that is to say, the voltage is advantageously provided in the most stable and/or constant manner possible during normal operation. In this context, the critical deviation of the input voltage can be specific for the case in which the input voltage has fallen below such a (critical) value at which this compensation is not (or no longer) ensured, for example, when it falls below 6.8 V.

Moreover, within the scope of the invention, in order to impress the signal, the signaling adaptation means can be configured to output the supply voltage with at least one voltage jump (as an adaption) that is different from and/or not proportional to a course of the input voltage, especially with an (additional) voltage jump and/or drop of the input voltage. This makes it possible to reliably and easily carry out a detection of the critical deviation in the consumer (in other words, by the consumer). For instance, the signal can also be output with at least one additional adaptation (for example, with at least another different voltage jump), in order to enhance the information content. In this manner, for instance, different changes in the input voltage can be distinguished.

Thus, with the energy supply device according to the invention, the signaling adaptation means can advantageously be configured to impress several signals and/or the signal in several stages or with other (different) adaptations. For example, in order to do so, the supply voltage for the consumer can be output with several different voltage jumps (having a different amplitude and/or level). These jumps can enhance the information content of the signaling and, for instance, they can correspond to different levels or stages of the input voltage. In this manner, at least one piece of information having a greater information content can be evaluated in the consumer on the basis of the (at least one) signal. For instance, this allows several levels or stages of the input voltage to be distinguished in the consumer. For this purpose, the signal can have, for example, at least two or three or four different adaptations (e.g. voltage jumps of a different magnitude).

It can also be advantageously provided that the signaling adaptation means is configured to impress the signal non-linearly and/or abruptly as a function of the input voltage. Such an adaptation means—for example, a circuit arrangement and/or a configuration of the transmission arrangement—can be provided in that, if the input voltage continues to drop, the supply voltage displays a course that is kept constant until the signal is impressed, and if applicable, it only deviates from this constantly kept course, for instance, if the input voltage continues to drop below a critical value. The constantly maintained course is attained, for instance, in that the supply voltage only fluctuates within a predefined tolerance range in order to ensure the reliable operation of the consumer.

Moreover, embodiments of the invention make it possible for the energy supply device to have a flyback converter functionality during normal operation, whereby preferably the input and output are galvanically isolated from each other so that the supply voltage can be galvanically isolated from the input voltage in order to reliably supply energy to the consumer.

In another embodiment of the energy supply device according to the invention, it can be provided that the signaling adaptation means monitors the input voltage in order to reliably detect the critical deviation in the consumer on the basis of the impressed signal. In this context, this can conceivably be passive monitoring, that is to say, without using a measuring circuit to measure the input voltage. Instead, a systematically prescribed electronic behavior of the transmission arrangement can be used as the signaling adaptation since, in the presence of the deviation relative to the supply voltage that has been output, the transmission arrangement can behave in a characteristic manner. Furthermore, in order to output the signal, the signaling adaptation means can be connected only to the output so that the signal is output exclusively via the supply voltage, meaning that additional measuring devices, signal outputs or the like can all be dispensed with.

Optionally, the energy supply device can be configured to impress the signal, and especially to monitor the input voltage, exclusively by means of a secondary function of existent components of the transmission arrangement and/or without a measuring device. This can be achieved in that, in order to provide the signaling adaptation, the components used and/or adapted by means of the signaling adaptation means are exclusively those which are primarily employed to provide the DC-to-DC converter functionality and/or the flyback converter functionality.

Another subject matter of the invention is a system comprising:
an electric consumer for a vehicle,
an energy supply device, especially an energy supply device according to the invention, for purposes of supplying electric power to the consumer, especially so that said energy supply device is electrically connected to the consumer via an output.

In this context, it is provided for the energy supply device to have a transmission arrangement preferably for purposes of establishing a connection to the on-board network of the vehicle to the consumer to supply energy in a galvanically isolated manner, and/or for purposes of providing a supply voltage to operate the consumer, via an input voltage from the on-board network of the vehicle.

The system according to the invention optionally provides for the transmission arrangement to comprise a signaling adaptation means for purposes of impressing a signal upon the supply voltage as a function of a deviation of the input voltage that is critical for the electric power supply, whereby said signal can be evaluated by the consumer on the basis of the supply voltage, for instance, by electronically evaluating the supply voltage, especially by means of an evaluation unit. In this manner, the system according to the invention entails the same advantages as those that have been extensively described with respect to an energy supply device according to the invention.

It is likewise advantageous if, within the scope of the invention, the consumer is configured as a control unit for the vehicle and is connected to at least one or at least two bus component(s) such as CAN bus component(s), especially (for instance, CAN) bus controllers and/or bus drivers, for purposes of establishing a connection to a bus of the vehicle. In this context, the bus can serve to transmit data between the control unit and other electronics of the vehicle. The bus is configured, for example, as a data bus or field bus or CAN bus, whereby in this context, CAN stands for Controller Area Network. However, it is also possible for the bus to be configured as a LIN bus (LIN stands for Local Interconnect Network), a FlexRay bus, a CAN FD (CAN with Flexible Data-Rate) and the like. Here, in case of an undervoltage, it must be possible to reliably switch off the bus controller in order to prevent or reduce so-called error frames that can lead to an elevated bus load and thus to malfunction of the bus communication. The signal or the evaluation of the signal can serve towards this end if the undervoltage has been ascertained on the basis of the evaluation.

It is optionally likewise provided that the input voltage can be supplied by the on-board network in order to supply energy to the control unit and/or the at least one bus component, whereby the voltage level of the supply voltage corresponds to the rated voltage of the on-board network during normal operation, and it falls below the rated voltage during signaling operation when the signal is being impressed. The control unit is configured, for instance, as a control unit of a high-voltage battery management system of the vehicle or as a control unit of the power electronics of an electric machine of the vehicle. In this context, it can be particularly important that an undervoltage of the input voltage can be reliably detected so that appropriate measures such as switching off the diagnostic operations can be initiated.

The vehicle can be configured as a passenger vehicle and especially as an electric vehicle, hybrid vehicle, fuel cell vehicle, or generally as a vehicle with several voltage layers owing to the presence of a so-called traction voltage, and preferably it has an on-board network with a rated voltage of 12 V. In particular, this on-board network serves to supply energy to at least one consumer, preferably the control unit. In order to ensure a sufficiently stable supply, at least one energy supply device according to the invention can be installed upstream from the control unit. This energy supply device optionally has a DC-to-DC converter functionality and/or a flyback converter functionality, for example, it increases the stability of the supply and/or a galvanic isolation as its primary function, and it monitors the input voltage and/or impresses the signal as its secondary function. In other words, the energy supply device according to the invention can thus conceivably be a modified DC-to-DC converter and/or a flyback converter which, in addition to the original structure for the primary function, also comprises signaling adaptation in order to perform the secondary function.

It is likewise advantageous for the energy supply device to be configured so as to be without a dedicated and/or separate signaling output for the signal and/or for the system to be without a separate measuring device or measuring apparatus for monitoring the input voltage, so that, as its primary function, the energy supply device can preferably effectuate the energy transmission between the on-board network and the consumer and, as its secondary function, it can effectuate the monitoring and signaling of the critical deviation. This translates into clear-cut cost savings.

BRIEF DESCRIPTION OF THE DRAWINGS

Other advantages, features and details of the invention ensue from the description below in which embodiments of the invention are described in detail making reference to the drawings. In this context, each of the features mentioned in the claims and in the description can be essential to the invention either on their own or else in any desired combination. The following is shown:

DETAILED DESCRIPTION OF THE INVENTION

Figure 1:
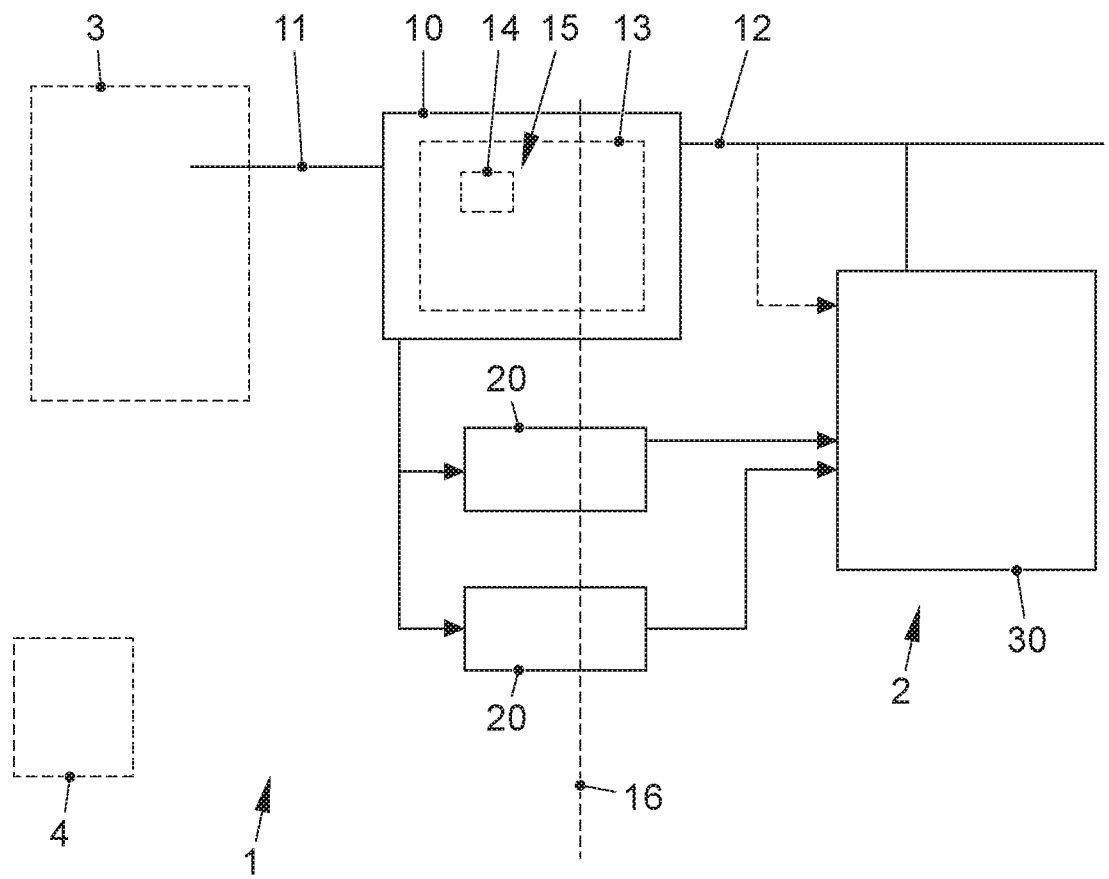
FIG. 1 is a schematic depiction of an energy supply device according to the invention as well as a system according to the invention.

In the figures below, identical reference numerals are employed for identical technical features, also in different embodiments.

FIG. 1 schematically shows parts of a system according to the invention having an energy supply device 10 according to the invention for purposes of supplying electric power to a consumer 2 of a vehicle 1. It can be seen that the energy supply device 10 has (at least) one input 11 for purposes of establishing a connection to an on-board network 3 of the vehicle 1 in order to provide an input voltage Ui for a transmission arrangement 13 of the energy supply device 10. In order to provide the input voltage Ui, the on-board network 3 is connected, for example, to an energy storage unit 4 of the vehicle 1 such as a rechargeable vehicle battery. The input 11 comprises, for instance, an electric connector such as a plug-in connector and/or clamped connector for purposes of establishing the electric connection to the on-board network 3. In this manner, an electric voltage from the on-board network 3 can be tapped as the input voltage Ui by means of the transmission arrangement 13. During normal operation, this input voltage Ui is at the same level as the rated voltage of the on-board network, for example, 12 V, whereby during operation, deviations can also occur that might affect normal operation. In order to nevertheless provide the most constant voltage supply possible at an operating voltage level Ub for the consumer 2, the energy supply device 10, especially in the form of a DC-to-DC converter and/or flyback converter, can be used to stabilize the voltage. Therefore, in order to operate the consumer 2, the energy supply device 10 has (at least) one output 12 for purposes of outputting a supply voltage Ua particularly in such a way that, during normal operation, the supply voltage Ua is kept more stably at the operating voltage level Ub than is the case with the input voltage Ui. For this reason, a transmission arrangement 13 is provided for purposes of transmitting electric energy between the input 11 and the output 12 in the energy supply device 10.

Moreover, it is particularly advantageous for the transmission arrangement 13 to comprise a signaling adaptation means 15, so that, as a function of a deviation of the input voltage Ui that is critical for the electric power supply, a signal S is impressed upon the supply voltage Ua which can be evaluated in the consumer (namely, by the consumer 2) on the basis of the supply voltage Ua. This allows the consumer 2 to detect a critical state at an early point in time without the need to provide an additional signaling line. In other words, the deviation can be detected directly on the basis of the supply voltage Ua which (preferably as the only voltage) serves to supply energy to the consumer 2. In this manner, it is possible to dispense with additional components, for instance, a measuring device to monitor the input voltage U1 and to output the signal S as well as the technical resources associated with this. In this context, the critical deviation can indicate that the normal operation is no longer ensured so that, once the deviation has been detected, the consumer can initiate measures to avoid unpredictable states caused by an insufficient supply of energy. Such measures include, for example, switching off (especially CAN) bus drivers 20.

It is also possible for an electric storage arrangement 14 to be provided to store energy so that, in order to compensate for a drop in the input voltage Ui, the supply voltage Ua is kept at a predefined operating voltage level Ub of the consumer 2, also during the voltage drop. In this context, the critical deviation of the input voltage Ui can be specific for the fact that the input voltage Ui has fallen below such a voltage value K at which the compensation is no longer ensured. This is also illustrated for the energy supply device 10 according to the invention on the basis of the characteristic line shown in FIG. 2 and on the basis of the voltage diagram shown in FIG. 3.

Figure 2:
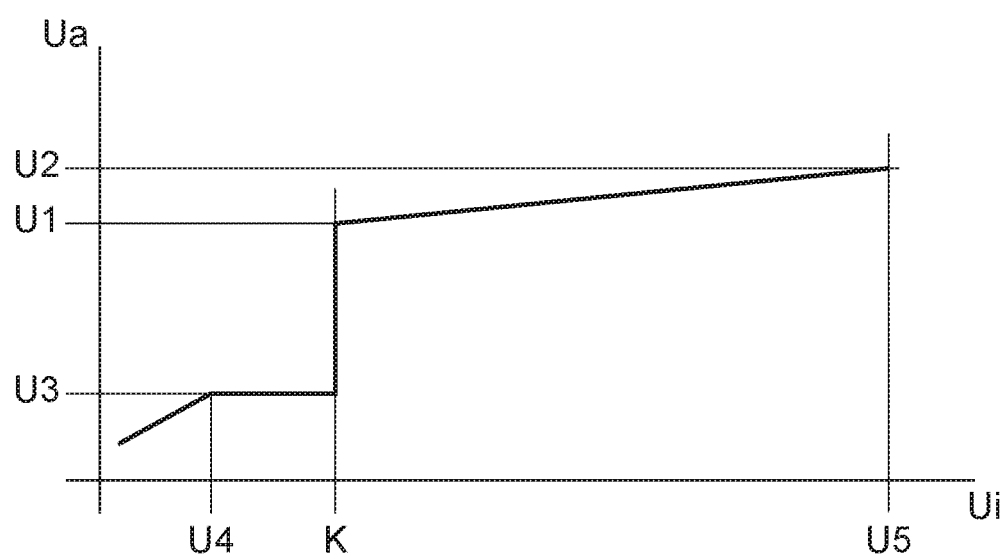
FIG. 2 is a diagram to illustrate a transmission behavior of the energy supply device.
Figure 3:
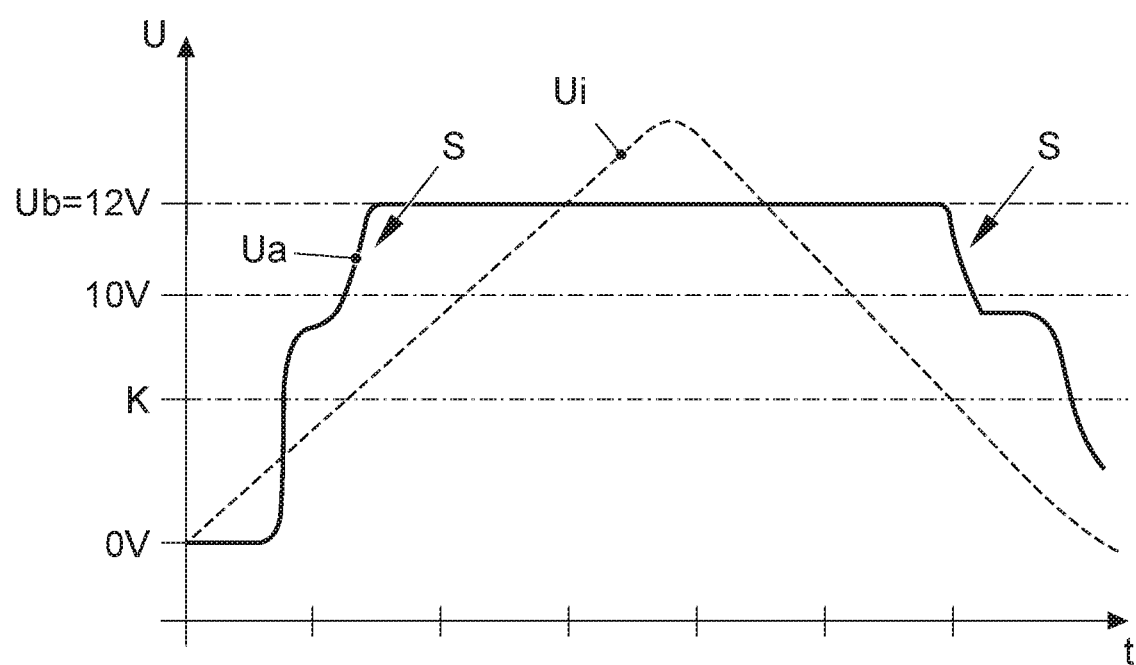
FIG. 3 is a schematic depiction of voltage curves to illustrate a transmission behavior of the energy supply device.

By way of an example, the characteristic line in FIG. 2 shows the association of the input voltage Ui with the supply voltage Ua as the output voltage Ua of the energy supply device 10 according to the invention. It can be seen that—in a range of the input voltage Ui between a critical voltage value K, for instance, of 6.8 V and a higher voltage value U5, for example, of 15 V—the output voltage Ua is kept essentially constant at an operating voltage level Ub (e.g. 12 V). In the example shown, the output voltage Ua in this range is between U1, e.g. at 12 V, and U2, e.g. at 14 V, that is to say, the fluctuation of the output voltage Ua is relatively small in comparison to the course of the input voltage Ui. For this range of the input voltage Ui between K and U5, one can thus speak of normal operation. In contrast, a critical deviation occurs if the input voltage Ui drops below K. Thus, it is clear that, below an input voltage Ui amounting to U4, for example, 6.3 V, the output voltage Ua likewise drops further, especially below U3, in other words, for instance, below 7 V. So that this deviation can be detected by the consumer at an early point in time, a signal S can be impressed upon the output voltage Ua. For this purpose, a jump in the output voltage Ua in the shown characteristic line of the energy supply device 10 is provided in the range of the input voltage Ui between U4 and K. In other words, the output voltage Ua drops by U1-U3, that is to say, for instance, by 5V, when the input voltage Ui falls below K. Thus, in this range of the input voltage Ui between U4 and K, the compensation for deviations of the input voltage Ui during normal operation as well as conceivably the proportionality between the input voltage Ui and the output voltage Ua are interrupted for purposes of outputting an output voltage Ua that is recognizably significant for the deviation. This corresponds to the signal S that can be easily and reliably detected in this manner. This behavior on the part of the energy supply device 10 can also be seen in FIG. 3, where the time curve of the input voltage Ui (over the time t) is shown in comparison to the associated curve of the output voltage Ua. By way of an example, the level of the operating voltage Ub has been chosen as 12 V, thus corresponding to the target value for the output voltage Ua as the supply voltage Ua (in other words, the voltage at which an optimal operation of the consumer 2 is possible).

Figure 4:
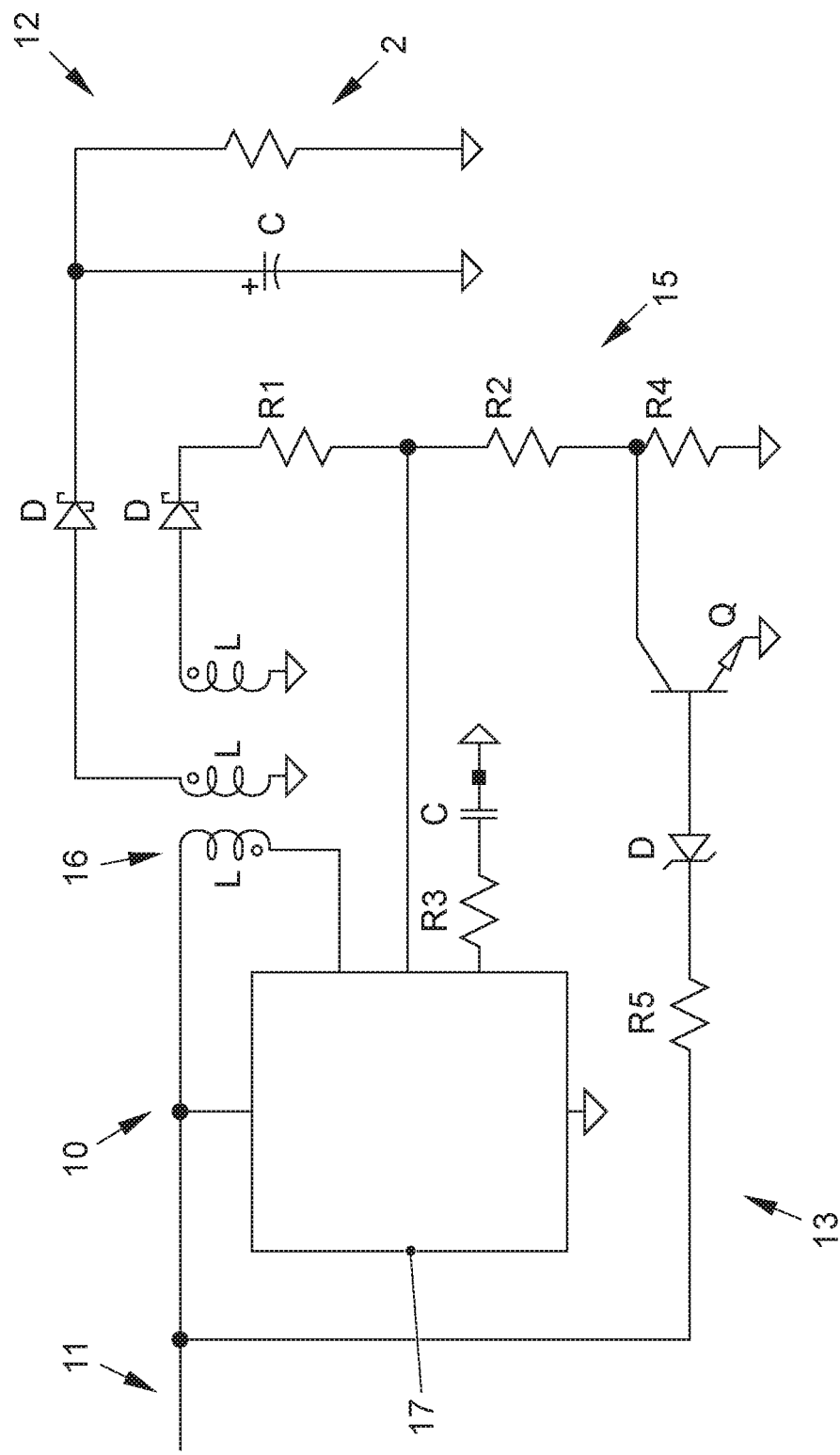
FIG. 4 is a schematic structure of an energy supply device.

FIG. 4 shows an example of a structure of the transmission arrangement 13. A signaling adaptation 15 can be provided by the structure shown and/or a by corresponding configuration of the components shown. Thus, for instance, a value of 10.7 kilohm can be selected for a first resistor R1, a value of 1.24 kilohm for the second resistor R2, a value of 1 kilohm for a third resistor R3 as well as for a fifth resistor R5, and a value of 470 ohm for a fourth resistor R4. Instead of the coils L shown for the galvanic isolation, it is also possible, for instance, to select an optocoupler or the like. Furthermore, a regulator 17 is shown that serves to regulate the current and that is preferably configured as an integrated circuit. In this context, this can be, for example, the LT1072 made by Linear Technology. Moreover, for the sake of completeness, the requisite diodes D, a transistor Q and capacitors C are shown in a configuration which allows the functionality of a flyback converter for the energy supply device 10. Here, the signaling adaptation means 15 can be configured to output the supply voltage Ua with a voltage jump in order to impress the signal S (in this context, see the voltage jump designated with the reference letter S in FIG. 3), and this voltage jump is different from and/or non-proportional to the curve of the input voltage Ui. Such a curve of the input voltage Ui is shown by way of an example in FIG. 3 by a broken line. The course of the input voltage Ui that causes the critical deviation can also be a voltage jump and/or a drop in the input voltage Ui. Moreover, the signaling adaptation means 15 can be configured to impress the signal S non-linearly and/or abruptly as a function of the input voltage Ui, namely, in such a way that, if the drop of the input voltage Ui increases, the supply voltage Ua displays a course that is kept constant until the signal S is impressed, especially all the way to a critical voltage value of the input voltage Ui at the level of K, and only then does it deviate from the constantly maintained course (in this context, also see FIGS. 2 and 3).

Furthermore, as shown in FIG. 4, it is possible for the energy supply device 10 to have a flyback converter functionality during normal operation. The input 11 and the output 12 can be galvanically isolated from each other in order to galvanically isolate the supply voltage Ua from the input voltage Ui in order to supply energy to the consumer 2. Towards this end, at least one of the coils L of the type shown in FIG. 4 is present. Instead, it is likewise possible to provide an optocoupler or the like in order to effectuate a galvanic isolation 16.

It is likewise possible for the signaling adaptation means 15 to monitor the input voltage Ui in order to detect the critical deviation in the consumer on the basis of the signal S, whereby, in order to output the signal S, the signaling adaptation means 15 is connected only (exclusively) to the output 12 so that the signal S is output exclusively via the supply voltage Ua. In FIG. 4, the output 12 shown is the only output of the energy supply device 10 that serves to supply energy to the consumer 2, and this is the output through which the signal S for the energy supply of the consumer 2 can be output at the same time.

Moreover, the energy supply device 10 can be configured to impress the signal S, and especially to monitor the input voltage Ui, exclusively by means of a secondary function of components present in the transmission arrangement 13 and/or else without any measuring devices. In other words, the energy supply device 10 can be configured without a dedicated signaling output for the signal S and/or a system according to the invention can be configured without a separate measuring device to measure the input voltage Ui. As a result, the energy supply device 10 can effectuate the energy transmission between the on-board network 3 and the consumer 2 as its primary function, and the monitoring and signaling of the critical deviation as its secondary function. Therefore, there is only one single voltage signal Ua which serves to signal the critical deviation as well as to supply energy. Consequently, an evaluation unit 30 of the consumer 2 such as, for example, a microcontroller, can, if applicable, exclusively evaluate the supply voltage Ua in order to initiate appropriate measures once a critical deviation has been detected. Optionally, the evaluation unit 30 is not connected to any other measuring device or the like, and/or the monitoring and/or the detection of the critical deviation in the system according to the invention are carried out entirely without measurement of the input voltage Ui.

FIG. 1 also shows that the consumer 2 can be configured as a control unit 2 for the vehicle 1 and that it is connected to at least one (especially CAN) bus driver 20, for purposes of establishing a connection to a (CAN) bus of the vehicle 1. In this context, the input voltage Ui can be delivered by the on-board network 3 in order to supply energy to the control unit 2 and the (CAN) bus driver 20, and the voltage level of the supply voltage Ua during normal operation can correspond to the rated voltage of the on-board network 3 (e.g. 12 V), whereas it can lie below the rated voltage during a signaling operation when the signal S is being impressed. In this context, in FIG. 2, the signaling operation is the operation within a range of the input voltage Ui between U4 and K, whereby normal operation is present above K.

The explanation of the embodiments provided above describes the present invention exclusively within the scope of examples. It goes without saying that individual features of the embodiments, insofar as technically meaningful, can be combined with each other as desired without departing from the scope of the present invention.

LIST OF REFERENCE NUMERALS 1 vehicle
2 consumer, control unit
3 on-board network
4 energy storage unit
10 energy supply device, DC-DC converter, flyback converter
11 input
12 output
13 transmission arrangement
14 storage arrangement
15 signaling adaptation means
16 galvanic isolation
17 regulator, current regulator
20 (CAN) bus driver
30 evaluation unit, microcontroller
K critical voltage value, threshold value
S signal
$U_i$ input voltage
$U_a$ supply voltage, output voltage
$U_b$ operating voltage level

The invention claimed is:

1. A system comprising:
an electric consumer for a vehicle,
an energy supply device for supplying electric power to the consumer, the energy supply device having a transmission arrangement to provide a supply voltage to operate the consumer, via an input voltage from an on-board network of the vehicle,
wherein the transmission arrangement comprises a signaling adaptation component for purposes of impressing a signal upon the supply voltage as a function of a deviation of the input voltage that is critical for the electric power supply, whereby said signal can be evaluated by the consumer on the basis of the supply voltage,
wherein the consumer is configured as a control unit for the vehicle and is connected to at least one bus driver, for establishing a connection to a bus of the vehicle,
whereby the input voltage can be supplied by the on-board network in order to supply energy to the control unit and/or the bus driver, and
whereby the voltage level of the supply voltage corresponds to the rated voltage of the on-board network during normal operation, and it falls below the rated voltage during signaling operation when the signal is being impressed.

2. The system according to claim 1, wherein the energy supply device comprises:
an input for establishing a connection to the on-board network of the vehicle in order to provide the input voltage for the transmission arrangement,
an output for outputting the supply voltage to operate the consumer,
the transmission arrangement for transmitting electric energy between the input and the output, wherein the transmission arrangement comprises a signaling adaptation component, so that, as a function of a deviation of the input voltage that is critical for an electric power supply, a signal is impressed upon the supply voltage, whereby the signal can be evaluated in the consumer on the basis of the supply voltage.

3. The system according to claim 1, further comprising an electric storage arrangement for storing energy, so that, in order to compensate for a drop in the input voltage, the supply voltage is kept at a predefined operating voltage level of the consumer during the drop as well, whereby the critical deviation of the input voltage is specific for the case in which the input voltage has fallen below such a voltage value at which the compensation is no longer ensured.

4. The system according to claim 1, wherein, in order to impress the signal, the signaling adaptation component is configured to output the supply voltage with at least one voltage jump that is different from and/or not proportional to a course of the input voltage or to a voltage jump and/or drop of the input voltage in order to carry out a detection of the critical deviation in the consumer.

5. The system according to claim 1, wherein the signaling adaptation component is configured to impress the signal non-linearly and/or abruptly as a function of the input voltage in such a way that, if the input voltage continues to drop, the supply voltage displays a course that is kept constant until the signal is impressed.

6. The system according to claim 1, wherein the energy supply device has a flyback converter functionality during normal operation, whereby the input and output are galvanically isolated from each other so that the supply voltage can be galvanically isolated from the input voltage in order to reliably supply energy to the consumer.

7. The system according to claim 1, wherein the signaling adaptation component monitors the input voltage in order to detect the critical deviation in the consumer on the basis of the impressed signal, whereby, in order to output the signal, the signaling adaptation component is connected only to the output so that the signal is output exclusively via the supply voltage.

8. The system according to claim 1, wherein the energy supply device is configured to impress the signal and to monitor the input voltage, exclusively by use of a secondary function of existent components of the transmission arrangement and/or without a measuring device.

9. The system according to claim 1, wherein the energy supply device is configured so as to be without a dedicated signaling output for the signal and/or the system is without a separate measuring device for monitoring the input voltage, so that, as its primary function, the energy supply device can effectuate the energy transmission between the on-board network and the consumer and, as its secondary function, it can effectuate the monitoring and signaling of the critical deviation.

* * * * *